United States Patent
Schneider et al.

(10) Patent No.: US 6,279,945 B1
(45) Date of Patent: Aug. 28, 2001

(54) GUIDE FITTING FOR INFLATABLE VEHICULAR SAFETY BELT

(75) Inventors: David W. Schneider, Waterford; Pontus Soderstrom, Rochester, both of MI (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 09/479,620

(22) Filed: Jan. 7, 2000

(51) Int. Cl.$^7$ ................................................. B60R 21/18
(52) U.S. Cl. ............................ 280/733; 280/808; 297/483
(58) Field of Search .................... 280/808, 733, 280/728.1, 801.1, 805, 801.2; 297/483, 470, 482; 24/163 R

(56) References Cited

U.S. PATENT DOCUMENTS

| | | | |
|---|---|---|---|
| 4,102,020 | * 7/1978 | Lindblad ..................... 24/163 R X |
| 4,642,853 | 2/1987 | Plesniarski et al. . |
| 5,037,135 | * 8/1991 | Kotikovsy et al. .................. 280/808 |
| 5,207,452 | 5/1993 | Collins . |
| 5,303,953 | * 4/1994 | Kamiyama et al. .................. 280/733 |
| 5,383,713 | 1/1995 | Kamiyama et al. . |
| 5,415,433 | * 5/1995 | Pfeiffer ............................ 280/808 |
| 5,474,326 | 12/1995 | Cho . |
| 5,601,311 | * 2/1997 | Pfeiffer et al. ................... 297/482 X |
| 5,829,841 | 11/1998 | Pywell et al. . |
| 5,833,267 | 11/1998 | Cordes et al. . |
| 5,851,055 | * 12/1998 | Lewis ................................. 297/483 |
| 5,899,499 | * 5/1999 | Ito ................................... 280/808 |
| 6,138,328 | * 10/2000 | Iseki .............................. 280/808 X |

FOREIGN PATENT DOCUMENTS

| | | |
|---|---|---|
| 2 228 127 | 1/1974 | (DE) . |
| 36 33 901 A1 | 4/1988 | (DE) . |
| 19804365 | * 8/1999 | (DE) . |
| 652 140 A1 | 5/1995 | (EP) . |
| 901 945 | 3/1999 | (EP) . |
| 97/23367 | * 7/1997 | (WO) . |

* cited by examiner

*Primary Examiner*—Brian L. Johnson
*Assistant Examiner*—Bryan Fischmann
(74) *Attorney, Agent, or Firm*—Sally J. Brown

(57) ABSTRACT

Vehicular restraint systems and associated fittings adapted for pivotal mounting onto a vehicle and for the guiding of an inflatable torso safety belt therethrough are provided. The fitting includes a clearance opening of selectively changeable thickness wherethrough the inflatable torso safety belt is passed to permit slidable movement thereof even when the inflatable safety belt is in an at least partially expanded or inflated state.

15 Claims, 4 Drawing Sheets

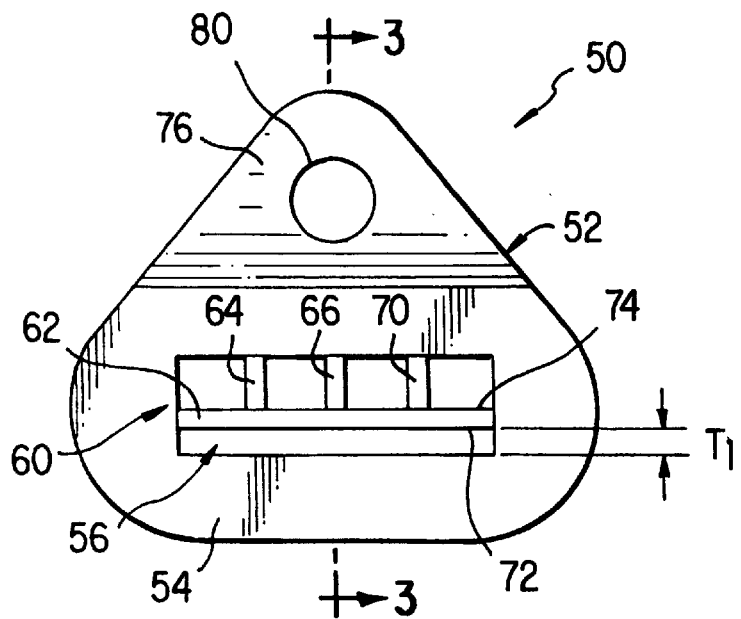
FIG. 2
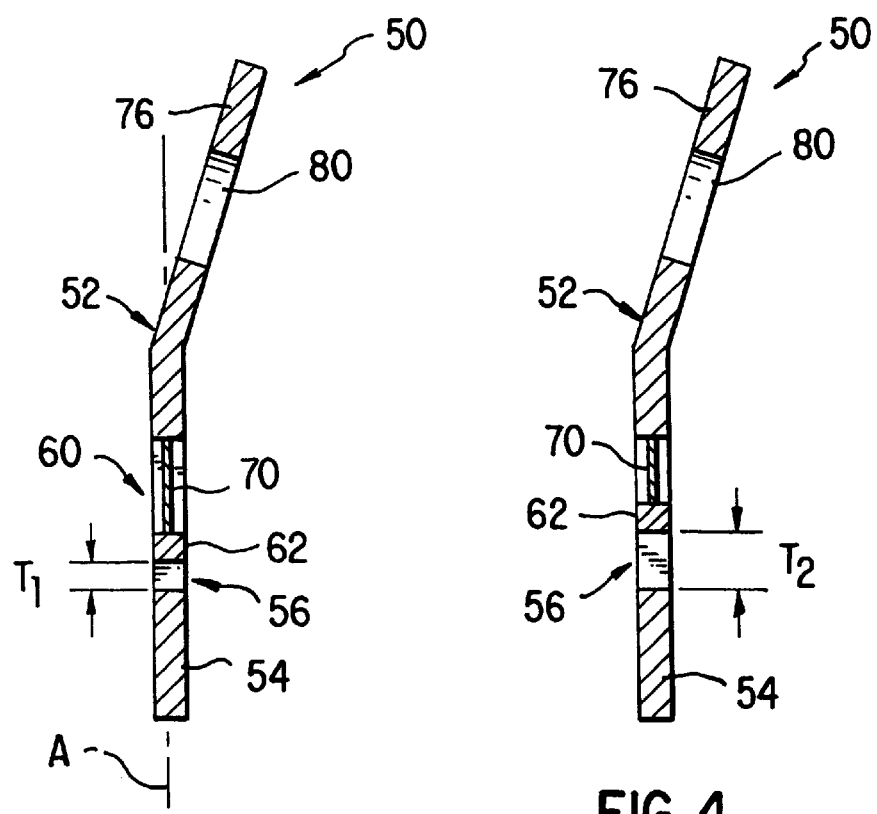
FIG. 3
FIG. 4

GUIDE FITTING FOR INFLATABLE VEHICULAR SAFETY BELT

BACKGROUND OF THE INVENTION

This invention relates generally to vehicular restraint systems and, more particularly, to guide fittings for use in association with an inflatable vehicular safety belt.

It is common for various vehicles, such as automobiles, to incorporate or employ restraint systems in an effort to protect passengers in the event of an emergency such as a vehicular collision. Typical vehicular restraint systems commonly incorporate one or more safety belts, oftentimes referred to as "seat belts," in order to restrain an occupant such as to prevent, reduce or minimize the possibility of the occupant contacting or striking various portions of interior of the vehicle such as the instrument panel, steering wheel, door or the like in a forcible manner.

Common safety belt restraint systems include a lap belt, such as designed to extend over the lap of a seated occupant, and a torso belt such as designed to extend diagonally across the upper torso of a seated occupant. Such restraint systems also commonly include a torso belt retractor mounted on, near or adjacent the door pillar most near the respective door-adjacent front seat occupant. Typically, torso belts are designed to exit the retractor and travel along the associated pillar where the belt extends through a guide fitting supported on the vehicle pillar or the like. The torso belt is then slidably passed through a hole or opening provided in the guide fitting. The guide fitting thus serves to slidably guide and deflect the torso belt diagonally downward across the upper torso of the occupant.

Should the seat belt webbing become twisted in or at such a guide fitting, it may become impossible to apply the webbing correctly. In addition, such twisting may impede slidable (e.g., back-and-forth) movement of the belt through the fitting such as is generally desired to provide increased comfort to a wearer while still providing the desired level of occupant protection. Accordingly, the hole or opening provided in such fittings for the slidable passage of the safety belt therethrough is commonly designed and sized to avoid or prevent the undesired twisting of the associated safety belt.

In practice, safety belts used in such systems have conventionally taken the form of a strip of fibrous webbing. While the use of such safety belts has been generally effective in avoiding or reducing injuries to vehicle occupants, the restraint or protection afforded by such use of safety belts has been subject to certain limitations. For example, in common seat belt apparatuses of this kind, the width of the belt webbing cannot be made very large and therefore comparatively large loads may be undesirably concentrated or focused over a relatively small limited contact area of the belt with the occupant. The concentration or focusing of such loads can, if not otherwise addressed, undesirably result in or increase the possibility of injury to the associated vehicle occupant.

To reduce or minimize the occurrence of such situations, inflatable safety belts have been proposed and developed. Inflatable safety belts typically include the shape or form of an inflatable bag or cushion. Inflatable safety belts are commonly designed, upon actuation, to inflate or expand in a matter of no more than a few milliseconds with an inflation fluid, e.g., a gas, produced or supplied by a device commonly referred to as an inflator. As will be appreciated, upon inflation or expansion of such a safety belt, the kinetic energy of the associated occupant can favorably be distributed over the wider contact area provided by the inflated safety belt. As a consequence of such load dispersal, the possibility of injury to an associated vehicle occupant can be desirably reduced or minimized.

While the use of inflatable safety belts may afford various such advantages, the use of such inflatable safety belts may raise various complications in design and implementation. For example, as set forth above, the size, e.g., thickness, of the guide hole or opening provided in fittings employed with safety belts is commonly restricted or limited such as to avoid or prevent the undesired twisting of the associated safety belt. Consequently, where the safety belt is inflatable, proper or desired inflation of such a belt may be undesirably restricted or limited due to the limited thickness of the belt hole or opening in the guide fitting. For example, the free flow or passage of inflation fluid, e.g., gas, into or through the inflatable safety belt may be restricted by such a guide fitting so as to impair reliable and complete realization of the beneficial utilization of inflatable safety belts in the distribution of loads over the wider contact area provided by the inflated safety belt.

In view of the above, there is a need and a demand for an improved guide fitting for use in association with an inflatable vehicular safety belt.

SUMMARY OF THE INVENTION

A general object of the invention is to provide an improved guide fitting for use in association with an inflatable vehicular safety belt.

A more specific objective of the invention is to overcome one or more of the problems described above.

The general object of the invention can be attained, at least in part, through a specified fitting adapted for pivotal mounting onto a vehicle and for the guiding of an inflatable torso safety belt therethrough. In accordance with one preferred embodiment of the invention, such a fitting desirably includes a plate member having a first generally planar portion. The first generally planar portion defines a clearance opening of selected thickness wherethrough the inflatable torso safety belt is passed to permit slidable movement thereof. The plate member also includes a compressible clearance opening edge portion which is compressible in the plane of the plate member first portion upon inflation of the inflatable torso safety belt thereagainst to selectively change the thickness of the clearance opening.

The prior art generally fails to provide as effective and efficient as desired guide fittings for use in association with inflatable safety belts. Thus, the prior art has generally suffered from or resulted in either or both limiting the use of such inflatable safety belts as well as limiting the effectiveness of such inflatable safety belts when used.

The invention further comprehends, in accordance with another preferred embodiment of the invention, such a fitting which includes a plate member defining first and second opposed plate faces with an attachment through-hole opening adapted for mounting of the fitting onto a vehicle. The plate member includes a first generally planar portion which defines a clearance hole having a preselected thickness for passage of the inflatable safety belt therethrough. The fitting also includes a cover element secured to the plate member in covering relationship relative to the attachment through-hole opening and at least a portion of the first plate face, including a portion of the clearance hole, to define a clearance opening. The clearance opening has a thickness no greater than the preselected thickness of the clearance hole. The inflatable safety belt is permitted to pass through the clearance opening to permit slidable movement thereof. At least a portion of the cover element in covering relationship relative to a portion of the clearance hole is deformable upon inflation of the inflatable torso safety belt thereagainst to selectively change the thickness of the clearance opening.

Other objects and advantages will be apparent to those skilled in the art from the following detailed description taken in conjunction with the appended claims and drawings.

BRIEF DESCRIPTION OF THE DRAWINGS

FIG. 2 is front plan view schematic of a guide fitting in accordance with one preferred embodiment of the invention in an at rest or static state.

FIG. 3 is an enlarged simplified cross sectional view schematic of the guide fitting shown in FIG. 2, taken substantially along the line 3—3 of FIG. 2 and viewed in the direction of the arrows.

FIG. 4 is an enlarged simplified cross sectional view schematic of the guide fitting shown in FIG. 2, but now shown in an activated or compressed state.

DETAILED DESCRIPTION OF THE INVENTION

The present invention, as is described in more detail below, provides an improved guide fitting for use in association with an inflatable vehicular safety belt. More particularly, the invention provides a fitting adapted for pivotal mounting onto a vehicle and for the guiding of an inflatable torso safety belt through a clearance hole of adjustable thickness provided in the fitting.

Figure 1:
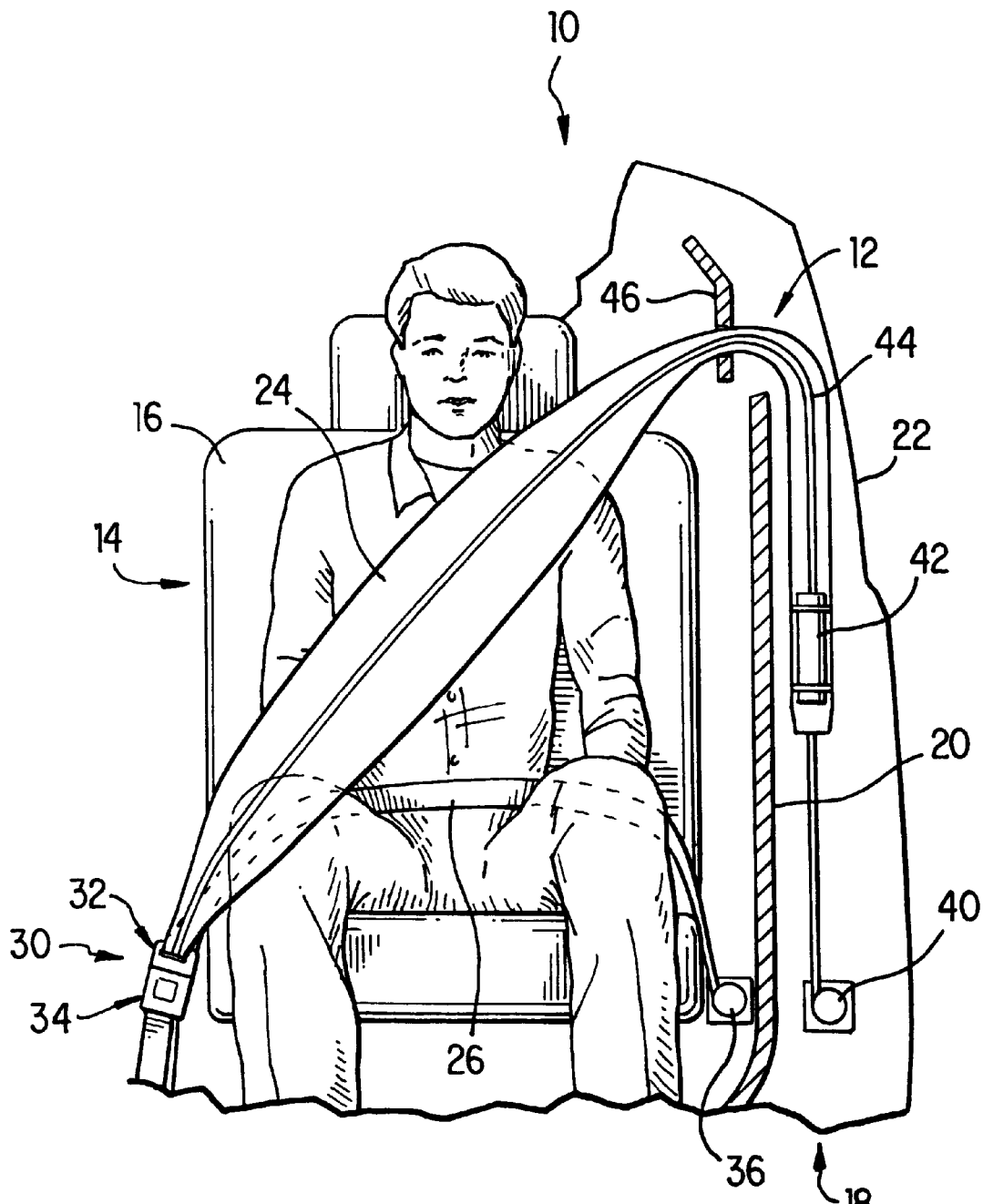
FIG. 1 is a fragmentary schematic of a vehicular restraint system installation incorporating a guide fitting, in accordance with one embodiment of the invention, in association with an inflatable torso safety belt, and wherein the restraint system is in an activated state, e.g., the torso safety belt is at least partially inflated.

Turning to FIG. 1, there is illustrated a vehicle, generally designated by the reference numeral 10, wherein is situated a restraint system 12, in accordance with one embodiment of the invention. The vehicle 10 includes an interior portion 14, having a seat 16, a B-pillar 18 with a trim portion 20, and an outer body wall 22.

As shown, the restraint system 12 is designed to properly restrain a vehicle occupant seated in the seat 16. The restraint system 12 is, as described in greater detail below, shown in an activated state, such as to effectively restrain the occupant in an emergency situation, such as a vehicle accident or collision. The restraint system 12 is generally composed of an inflatable torso safety belt 24, a conventional lap seat belt 26 or the like and a locking buckle assembly 30. The locking buckle assembly 30 includes a latch plate or buckle tongue device 32, to which one end of each of the inflatable torso safety belt 24 and the lap seat belt 26 is attached or fixed, such as in a manner known in the art. The locking buckle assembly 30 also includes a locking buckle 34, such as fixedly joined or extending from the vehicle floor, and to which the buckle tongue device 32 can be appropriately coupled such as in a manner known in the art.

The restraint system 12 includes, in association with the lap belt 26, a lap belt retractor device 36 such as situated near or adjacent the vehicle floor, as is known in the art.

The restraint system 12 further includes, in association with the inflatable torso safety belt 24, a torso safety belt retractor 40, an inflator device 42 and a conduit 44 for the fluid communication of inflation fluid from the inflator device 42 into the inflatable torso safety belt 24. If desired and as shown, either or both the torso safety belt retractor 40 and the inflator device 42 can be advantageously placed in or stored along the vehicle B-pillar 18, such as between the interior trim 20 and the outer body wall 22.

The restraint system 12 still further includes a guide fitting 46, such as described in greater detail below and such as pivotally mounted or fixed to the vehicle 10 at a predetermined position above the seat 16, such as at or near the B-pillar 18. The guide fitting 46 permits the slidable movement of the inflatable torso safety belt 24 therethrough such as may be desired or required to properly provide vehicle occupant protection while doing so in a manner which is of reduced intrusiveness to the riding comfort of the occupant.

Now turning to FIGS. 2–4, there is illustrated a guide fitting 50 in accordance with one preferred embodiment of the invention. More particularly, the guide fitting 50 is shown in FIGS. 2 and 3 in an at rest or static state and in FIG. 4 in an activated state.

The guide fitting 50 includes a plate member 52 having a first portion 54 which is generally planar in form, with the plane of such first portion 54 generally designated A and shown in FIG. 3. The first generally planar portion 54 defines a clearance opening 56 wherethrough an inflatable torso safety belt (not shown) can be passed to permit the slidable movement thereof. The clearance opening 56 has an initial or at rest selected thickness designated $T_1$, shown in FIG. 3.

The plate member 52 includes a clearance opening edge portion 60 generally compressible in the plane A of the first portion 54 upon inflation of an associated inflatable torso safety belt (not shown) thereagainst to selectively change the thickness of the clearance opening 56. More particularly, the compressible clearance hole edge portion 60 comprises a contact element 62 and one or more compressible elements 64, 66 and 70.

The contact element 62 has a first side 72, such as adapted to be disposed adjacent an associated inflatable torso safety belt, and a second side 74 such as adapted to be in contact or otherwise adjacent the one or more compressible elements 64, 66, and 70. The contact element 62, in accordance with the invention and as may be desired, can be formed or made of a compressible material or, alternatively, a non-compressible material. In accordance with one preferred embodiment, the contact element desirably is in the form of a roller such as may simplify and enhance the slidable movement of a safety belt in association therewith.

In accordance with the broader practice of the invention, various compressible materials can be used to form or create suitable compressible elements. For example, in accordance with particular preferred embodiments of the invention, such compressible materials may desirably take the form of one or more spring elements such as in the form of a metal spring or one or more compressible foam elements such as constructed of a compressible foam, such as generally known in the art.

Further, while the guide fitting 50 is illustrated as having three compressible elements, those skilled in the art and guided by the teachings herein provided will appreciate that particular embodiments of the invention may include a fewer or greater number of compressible elements as may be desired or required for particular applications and performance requirements.

The guide fitting plate member 52 also includes a second generally planar portion 76 such as angularly disposed relative to the first generally planar portion 54 and continuously extending therefrom. The second generally planar portion 76 includes an attachment opening 80 such as may be included to permit or allow the mounting of the guide fitting 50 onto a vehicle such as in a pivotal or rotatable manner, such as is known in the art.

FIG. 4 illustrates the guide fitting 50 in an activated or compressed state. More particularly, one or more, preferably each, of the compressible elements 64, 66 and 70, respectively, has been compressed such as to result in the clearance opening 56 having an enlarged or increased thickness, designated $T_2$, where $T_2$ is greater than $T_1$. As will be appreciated, such an enlarged clearance opening will generally more easily permit the desired passage of an associated inflatable safety belt therethrough, even when such safety belt is in an at least partially inflated condition or state.

Figure 5:
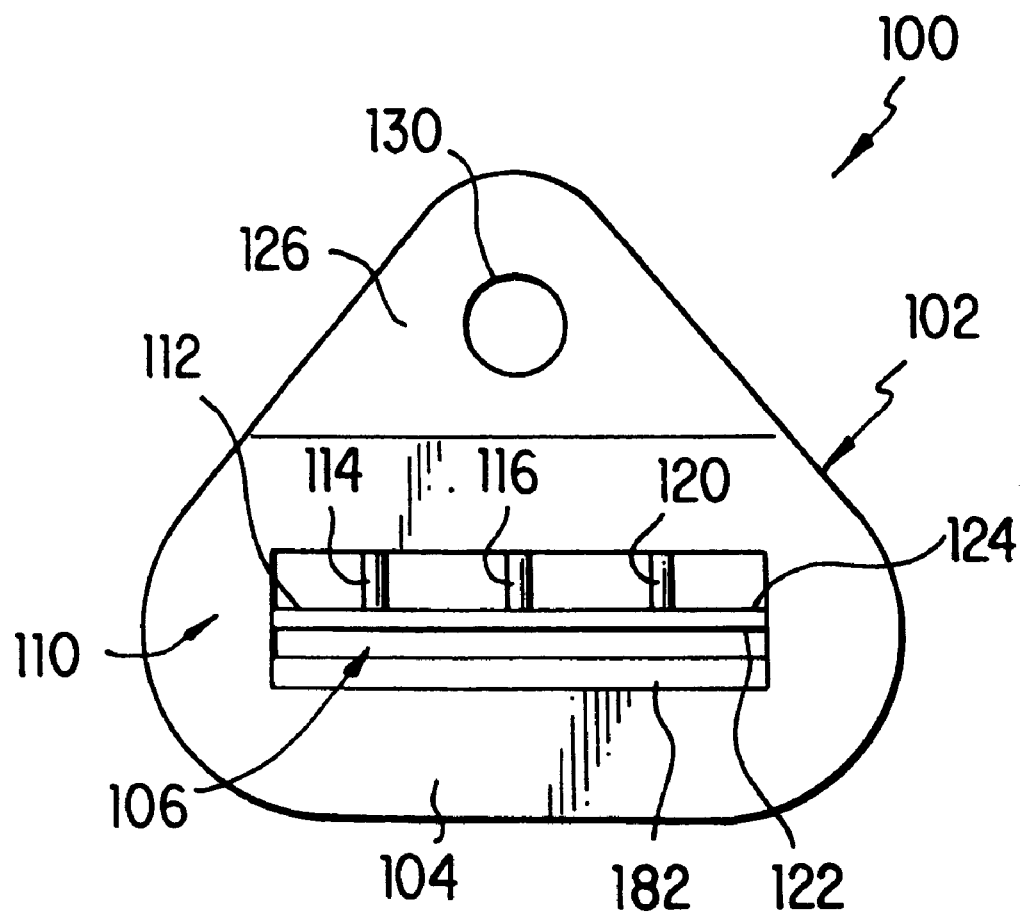
FIG. 5 is a simplified cross sectional view schematic, similar to the view shown in FIG. 3, of a guide fitting in accordance with another preferred embodiment of the invention in an at rest or static state.

FIG. 5 illustrates a guide fitting 100 in accordance with another preferred embodiment of the invention. The guide fitting 100 is generally similar to the guide fitting 50 described above in that it includes a plate member 102 having a first portion 104 which defines a clearance opening 106 wherethrough an inflatable torso safety belt (not shown) can be passed to permit the slidable movement thereof. The plate member 102 also includes a clearance opening edge portion 110 generally compressible in the plane of the first portion 104 upon inflation of an associated inflatable torso safety belt thereagainst and such as to selectively change the thickness of the clearance opening 106. More particularly, the compressible clearance opening edge portion 110 comprises a contact element 112 and one or more compressible elements 114, 116 and 120.

The contact element 112 has a first side 122, such as adapted to be disposed adjacent an associated inflatable torso safety belt, and a second side 124 such as adapted to be in contact or otherwise adjacent the one or more compressible elements 114, 116, and 120. The contact element 112, in accordance with the invention and as may be desired, can be formed or made of a compressible material or, alternatively, a non-compressible material. In accordance with one preferred embodiment, the contact element desirably is in the form of a roller such as may simplify and enhance the slidable movement of a safety belt in association therewith.

The guide fitting plate member 102 also includes a second generally planar portion 126 such as angularly disposed relative to the first generally planar portion 104 and continuously extending therefrom. The second generally planar portion 126 includes an attachment opening 130 such as may be included to permit or allow the mounting of the guide fitting 100 onto a vehicle such as in a pivotal or rotatable manner, such as is known in the art.

The guide fitting 100, however, primarily differs from the guide fitting 50 described above in that the guide fitting 100 includes a roller element 182 disposed opposite the contact element 112, relative to the clearance opening 106.

Thus, it is to be appreciated that guide fittings in accordance with the invention can include roller elements either as a part of a compressible clearance hole edge portion contact element, or an oppositely disposed a compressible clearance opening edge portion relative to a respective clearance opening or both, as may be desired in particular applications.

Figure 6:
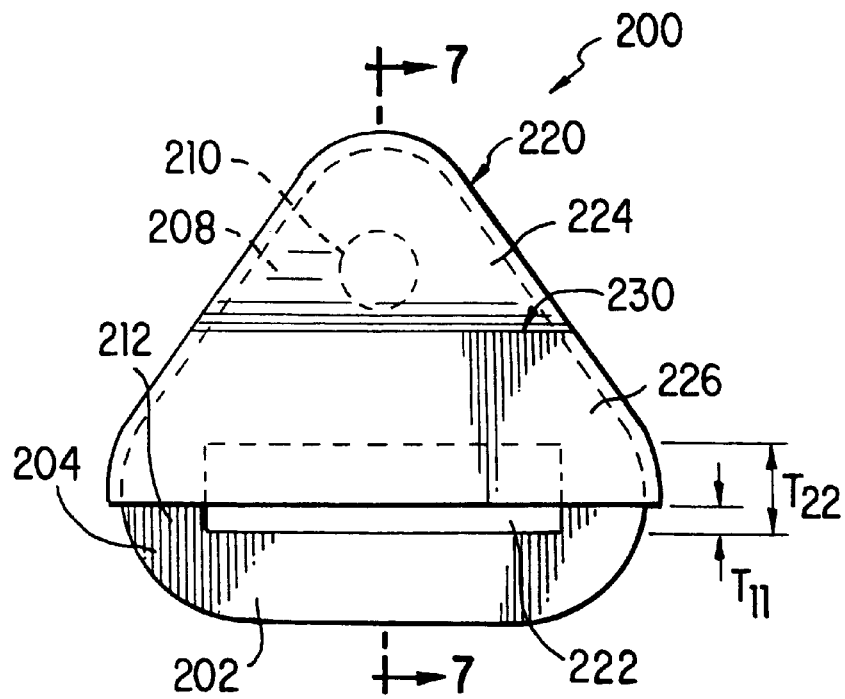
FIG. 6 is a front plan view schematic of a guide fitting in accordance with another preferred embodiment of the invention in an at rest or static state.
Figure 7:
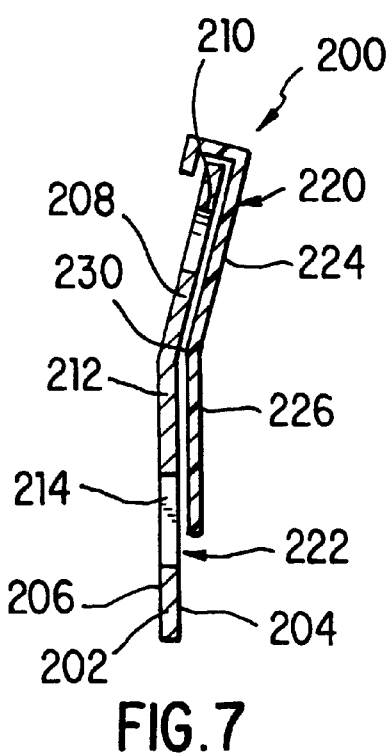
FIG. 7 is a simplified cross sectional view schematic of the guide fitting shown in FIG. 6, taken substantially along the line 7—7 of FIG. 6 and viewed in the direction of the arrows.
Figure 8:
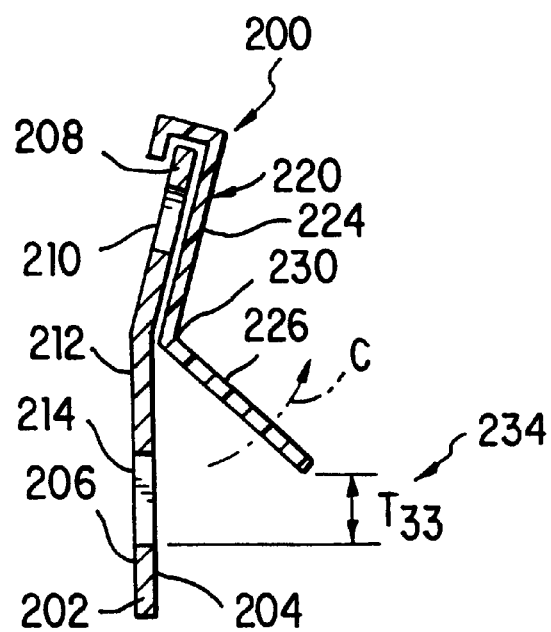
FIG. 8 is a simplified cross sectional view schematic of the guide fitting shown in FIG. 6, but now shown in an activated state.

Now turning to FIGS. 6–8 there is illustrated a guide fitting 200 in accordance with another preferred embodiment of the invention. More particularly, the guide fitting 200 is shown in FIGS. 6 and 7 in an at rest or static state and in FIG. 8 in an activated state.

The guide fitting 200 includes a plate member 202 defining first and second opposed plate faces 204 and 206, respectively. The plate member 202 includes a generally planar portion 208 which includes an attachment through-hole opening 210 adapted for mounting of the guide fitting 200 onto an associated vehicle in a manner such as known in the art.

The plate member 202 also includes a generally planar portion, designated by the reference character 212. The plate member planar portions 208 and 212 are generally continuously extending and angularly disposed relative to each other, similar to the planar portions 54 and 76 of the guide fitting 50 described above, for example.

The plate member planar portion 212 defines a clearance hole 214 adapted to permit passage of an associated inflatable torso safety belt therethrough. The clearance hole 214 is of a preselected thickness designated $T_{11}$.

The guide fitting 200 also includes a cover element, designated 220. It is generally well known to include a cover element relative to a safety belt guide fitting such as to improve the appearance of corresponding restraint system installations such as by better or more closely matching the appearance of other components or aspects of the interior trim of a respective vehicle. As will be described in greater detail below and in accordance with the preferred practice of this aspect of the invention, the cover element 220 also desirably serves to functionally enhance the guide fitting 200 and the use thereof.

The cover element 220 is desirably secured to the plate member 202 in a manner such as known in the art. In a preferred embodiment of this aspect of the invention, the cover element 220 is placed in covering relationship relative to the attachment through-hole opening 210 and at least a portion of the first plate face 204, including a portion of the clearance hole 214 to define a clearance opening 222, shown in FIGS. 6 and 7. The clearance opening 222 has a thickness (designated $T_{22}$) which is no greater than the preselected thickness of the clearance hole 214 ($T_{11}$) and wherethrough the associated inflatable safety belt is adapted to be passed to permit the slidable movement of such safety belt. More particularly, the cover element 220 includes a first or upper section 224 and a second or lower section 226. The cover element lower section 226 at least partially overlies or extends over the clearance hole 214 such as to thereby at least in part define the clearance opening 222.

The cover element upper and lower sections 224 and 226, respectively, are connected or otherwise joined together at or by a hinge region 230. The hinge region 230 permits the hinged rotation or movement of the cover element lower section 226 relative to the cover element upper section 224 and consequently relative to the plate member 202 as such cover element upper section 224 is, in accordance with a preferred embodiment of the invention, desirably secured or fixed relative to such plate member 202.

FIG. 8 illustrates the guide fitting 200 in an activated state, such as when the associated inflatable torso safety belt has at least in part been inflated such that the belt assumes a greater thickness. In such activated state, the cover element lower section 226 is desirably rotated, at least in part, in a direction away from the clearance hole 214, as signified by the arrow C such as to form an enlarged clearance opening 234 having a thickness designated $T_{33}$, where $T_{33}$ is greater than $T_{22}$.

As will be appreciated, such cover element rotation is desirably facilitated as the cover element upper and lower sections 224 and 226, respectively, are connected or otherwise joined together at or by the hinge region 230. In particular, though the cover element upper section 224 is fixed relative to the plate member 202, the lower section 226 hingedly extends therefrom to permit the desired rotation of the cover element in a direction away from the clearance hole 214. Further, as described above, such an enlarged clearance opening will generally more easily permit the desired passage of an associated inflatable safety belt therethrough, even when such safety belt is in an at least partially inflated condition or state.

Thus, the invention provides vehicular restraint systems and associated guide fittings of improved effectiveness and efficiency. More particularly, the invention provides a guide fitting which includes a clearance opening of selectively changeable thickness wherethrough the inflatable torso safety belt can be passed to permit slidable movement thereof even when the inflatable safety belt is in an at least partially expanded or inflated state. As a result, the invention may more readily allow or permit the more widespread and effective use of such inflatable safety belts and such as may result in the greater or more effective protection of vehicle occupants.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. A fitting adapted for pivotal mounting onto a vehicle and for the guiding of an inflatable torso safety belt therethrough, the fitting comprising:

a plate member having a first generally planar portion defining a clearance opening of selected thickness for the inflatable torso safety belt to pass through and permit slidable movement thereof, the plate member including a base portion to contact with the inflatable torso safety belt and a compressible clearance opening edge portion spaced apart from the base portion by the clearance opening, the compressible clearance opening edge portion compressible in the plane of the plate member first portion for permitting inflation of the inflatable torso safety belt thereagainst to selectively change the thickness of the clearance opening, the compressible clearance hole edge portion comprising a contact element having opposed first and second sides with the first side for disposition adjacent to the inflatable torso safety belt, the compressible clearance hole edge portion also including a compressible element disposed adjacent the second side of the contact element.

2. The fitting of claim 1 wherein:

the contact element comprises a non-compressible material.

3. The fitting of claim 1 wherein:

the contact element comprises a first roller member.

4. The fitting of claim 3 wherein:

the plate member also includes a second roller member disposed opposite the first roller member relative to the clearance opening.

5. The fitting of claim 1 wherein:

the plate member also includes a roller member disposed opposite the compressible clearance opening edge portion relative to the clearance opening.

6. The fitting of claim 1 wherein:

the compressible element comprises at least one spring element.

7. The fitting of claim 1 wherein the plate member additionally comprises a second generally planar portion angularly disposed relative to the first generally planar portion.

8. The fitting of claim 7 wherein the second generally planar portion includes an attachment opening adapted for mounting of the fitting onto a vehicle.

9. A vehicular restraint system comprising the fitting of claim 1 and additionally comprising:

a lap safety belt and a tongue element to which a first end of the lap safety belt is fixed and for permitting a first end of the inflatable torso safety belt to be fixed thereto.

10. The combination of the fitting of claim 1 and an inflatable torso safety belt adapted to be passed through the clearance opening of the fitting.

11. A fitting adapted for pivotal mounting onto a vehicle and for the guiding of an inflatable torso safety belt therethrough, the fitting comprising:

a plate member having a first generally planar portion defining a clearance opening of selected thickness for the inflatable torso safety belt to pass through and permit slidable movement thereof, the plate member including a compressible clearance opening edge portion compressible in the plane of the plate member first portion for permitting inflation of the inflatable torso safety belt thereagainst to selectively change the thickness of the clearance opening wherein:

the compressible clearance hole edge portion comprises a contact element for disposition adjacent the inflatable torso safety belt and a compressible element for disposition opposite the inflatable torso safety belt relative to the contact element, the compressible element comprising a compressible foam material.

12. A fitting adapted for pivotal mounting onto a vehicle and for the guiding of an inflatable torso safety belt therethrough, the fitting comprising:

a plate member defining first and second opposed plate faces with an attachment through-hole opening adapted for mounting of the fitting onto a vehicle, the plate member including a first generally planar portion defining a clearance hole having a preselected thickness for passage of the inflatable safety belt therethrough; and a cover element secured to the plate member in covering relationship relative to the attachment through-hole opening and at least a portion of the first plate face, including a portion of the clearance hole to define a clearance opening having a thickness no greater than the preselected thickness of the clearance hole and for passage of the inflatable safety belt therethrough to permit slidable movement thereof, wherein at least a portion of the cover element in covering relationship relative to a portion of the clearance hole is deformable for permitting inflation of the inflatable torso safety belt thereagainst to selectively change the thickness of the clearance opening wherein the cover element comprises a first section fixed relative to the plate member and a second section hingedly extending from the first section and at least partially overlying the clearance hole for permitting inflation of the inflatable torso safety belt with the cover element second section hingedly rotating to form a clearance opening of increased thickness.

13. The fitting of claim 12 wherein the plate member includes an attachment opening adapted for mounting of the fitting onto a vehicle.

14. A vehicular restraint system comprising the fitting of claim 12 and additionally comprising:

a lap safety belt and a tongue element to which a first end of the lap safety belt is fixed and for permitting a first end of the inflatable torso safety belt to be fixed thereto.

15. The combination of the fitting of claim 12 and an inflatable torso safety belt adapted to be passed through the clearance opening of the fitting.

* * * * *